(12) United States Patent
Jung et al.

(10) Patent No.: US 10,282,123 B2
(45) Date of Patent: May 7, 2019

(54) DATA STORAGE DEVICE AND OPERATING METHOD THEREOF

(71) Applicant: SK hynix Inc., Gyeonggi-do (KR)

(72) Inventors: Hoe Seung Jung, Gyeonggi-do (KR); Yun Chan Seo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 8 days.

(21) Appl. No.: 15/339,611

(22) Filed: Oct. 31, 2016

(65) Prior Publication Data

US 2018/0004420 A1 Jan. 4, 2018

(30) Foreign Application Priority Data

Jul. 4, 2016 (KR) ........................ 10-2016-0084183

(51) Int. Cl.
*G06F 12/00* (2006.01)
*G06F 3/06* (2006.01)

(52) U.S. Cl.
CPC ............ *G06F 3/064* (2013.01); *G06F 3/0604* (2013.01); *G06F 3/0605* (2013.01); *G06F 3/0631* (2013.01); *G06F 3/0679* (2013.01); *G06F 12/00* (2013.01)

(58) Field of Classification Search
None
See application file for complete search history.

(56) References Cited

U.S. PATENT DOCUMENTS

2017/0038977 A1* 2/2017 Yeh .................. G06F 3/0608
2017/0083372 A1* 3/2017 Lin .................... G06F 3/061

FOREIGN PATENT DOCUMENTS

KR 101512927 4/2015

* cited by examiner

*Primary Examiner* — Jason W Blust
(74) *Attorney, Agent, or Firm* — IP & T Group LLP (57) ABSTRACT

A data storage device includes a nonvolatile memory device including a plurality of memory blocks each of which includes a plurality of pages; and a controller suitable for obtain block physical to logical (P2L) data corresponding to a first memory block among the plurality of memory blocks, determine first and second target logical to physical (L2P) pages, one or more first target L2P segments stored in the first target L2P page and one or more second target L2P segments stored in the second target L2P page, based on the block P2L data and an L2P segment position table, obtain the first target L2P segments, and verify validity for one or more first P2L data included in the block P2L data, based on the first target L2P segments, wherein the controller obtains the second target L2P segments while verifying the validity for the first P2L data.

10 Claims, 8 Drawing Sheets

DATA STORAGE DEVICE AND OPERATING METHOD THEREOF

CROSS-REFERENCES TO RELATED APPLICATION

The present application claims priority under 35 U.S.C. § 119(a) to Korean application number 10-2016-0084183, filed on Jul. 4, 2016 in the Korean Intellectual Property Office, which is Incorporated herein by reference in its entirety.

BACKGROUND

1. Technical Field

Various embodiments of the present invention relate generally to a data storage device and, more particularly, to a data storage device including a nonvolatile memory device.

2. Related Art

Data storage devices store data provided by an external device in response to a write request. Data storage devices may also provide stored data to an external device in response to a read request. Examples of external devices that use data storage devices include computers, digital cameras, cellular phones and the like. Data storage devices may be embedded in an external device during manufacturing of the external devices or may be fabricated separately and then connected afterwards to an external device.

SUMMARY

In an embodiment, a data storage device may include: a nonvolatile memory device including a plurality of memory blocks each of which includes a plurality of pages; and a controller configured to obtain block physical to logical (P2L) data corresponding to a first memory block among the plurality of memory blocks, determine first and second target logical to physical (L2P) pages, one or more first target L2P segments stored in the first target L2P page and one or more second target L2P segments stored in the second target L2P page, based on the block P2L data and an L2P segment position table, obtain the first target L2P segments, and verify validity for one or more first P2L data included in the block P2L data, based on the first target L2P segments, wherein the controller obtains the second target L2P segments while verifying the validity for the first P2L data.

In an embodiment, a method for operating a data storage device may include: obtaining block physical to logical (P2L) data corresponding to a first memory block among the plurality of memory blocks; determining first and second target logical to physical (L2P) pages, at least one first target L2P segment stored in the first target L2P page and at least one second target L2P segment stored in the second target L2P page, based on the block P2L data and an L2P segment position table; obtaining the at least one first target L2P segment; verifying validity for at least one first P2L data included in the block P2L data, based on the at least one first target L2P segment; and obtaining the at least one second target L2P segment while verifying the validity for the first P2L data.

In an embodiment, a method for operating a data storage device may include: obtaining block physical to logical (P2L) data corresponding to a first memory block among the plurality of memory blocks; determining a target logical to physical (L2P) page based on the block P2L data and an L2P segment position table; searching L2P segments stored in the target L2P page, based on the L2P segment position table; determining at least one target L2P segment among the L2P segments, based on the block P2L data; and verifying validity for at least one P2L data included in the block P2L data, based on the at least one target L2P segment.

BRIEF DESCRIPTION OF THE DRAWINGS

These and other features and advantages of the present invention will become apparent to those skilled in the art to which the present invention pertains from the following detailed description of specific embodiments of the present invention in reference with the accompanying drawings.

DETAILED DESCRIPTION

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can practice the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be also understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

As used herein, singular forms are intended to include the plural forms as well, unless the context clearly indicates otherwise. Also, the terms "comprises", "comprising", "includes", "including" and the like when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the art to which this invention pertains, an element (also referred to as a feature) described in connection with one embodiment may be used singly or in combination with other elements of another embodiment, unless specifically indicated otherwise.

Hereinafter, the various embodiments of the present invention will be described in detail with reference to the attached drawings.

Figure 1:
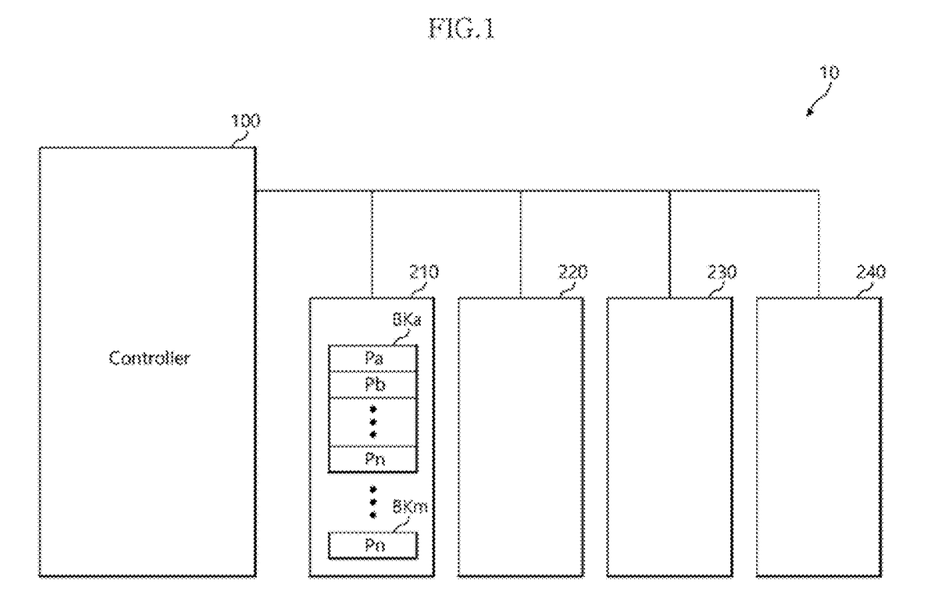
FIG. 1 is a block diagram illustrating a data storage device, according to an embodiment of the present invention.

Referring now to FIG. 1, a data storage device 10 is provided, according to an embodiment of the present invention.

The data storage device 10 may be configured to store data provided from an external device (not shown), in response to a write request from the external device. Also, the data storage device 10 may be configured to provide stored data to the external device, in response to a read request from the external device.

The data storage device 10 may be prepared in the form of a Personal Computer Memory Card International Association (PCMCIA) card, a Compact Flash (CF) card, a smart media card, a memory stick, various multimedia cards (e.g., MMC, eMMC, RS-MMC, and MMC-Micro), various secure digital cards (e.g., SD, Mini-SD, and Micro-SD), a Universal Flash Storage (UFS), a Solid State Drive (SSD) and the like.

The data storage device 10 may include a controller 100 and memory devices 210 to 240. The memory devices 210 to 240 may be nonvolatile memory devices.

The controller 100 may control one or more operations of the data storage device 10. In an embodiment, the controller 100 may control all the operations of the data storage device 10. For example, the controller 100 may control at least one of a read and write operation. Also, for example, the controller may control at least one background operation of the data storage device 10. More specifically, the controller may store data in at least one of the nonvolatile memory devices 210 to 240 in response to a write request received from a first external device. Also, the controller 100 may read data stored in at least one of the nonvolatile memory devices 210 to 240 and output the read data to a second external device in response to a read request received from the external device. The first and second external devices may be the same device or may be different devices.

The controller 100 may perform a background operation, such as for example, a garbage collection operation for at least one of the nonvolatile memory devices 210 to 240. For example, the controller 100 may perform a garbage collection operation by selecting a victim memory block among a plurality of memory blocks of at least one of the nonvolatile memory devices 210 to 240, storing all the valid data of the victim memory block in an empty memory block and converting the victim memory block into an empty memory block. Storing all the valid data of the victim memory block to the empty memory block, may include the controller 100 first classifying the data stored in the victim memory block into valid and invalid data. For example, the controller 100 may verify validity of physical to logical (P2L) data corresponding to each of the pages of the victim memory block, and thereby determine whether each of the pages is a valid page or an invalid page.

For example, the controller 100 may obtain block P2L data of the victim memory block to verify validity of each pages of the victim memory block. The controller 100 may determine a target logical to physical (L2P) page for each of the nonvolatile memory devices 210 to 240, and determine target L2P segments stored in the target L2P page. The controller 100 may control any one of the nonvolatile memory devices 210 to 240 to output target L2P segments to the controller 100. At the same time of verifying validity of P2L data based on the outputted target L2P segments, the controller 100 may control another nonvolatile memory device to read data stored in the target L2P page of the corresponding nonvolatile memory device, to a data buffer included in the corresponding nonvolatile memory device.

The nonvolatile memory devices 210 to 240 may store data received from the controller 100 and may read stored data and transmit read data to the controller 100, according to control of the controller 100. The nonvolatile memory device 210 may include a plurality of memory blocks (e.g., BKa to BKm). A memory block may be a unit by which a nonvolatile memory device performs an erase operation. A memory block (e.g., BKa) may include a plurality of pages (e.g., Pa to Pn). A page may be a unit by which a nonvolatile memory device reads data to a data buffer (not shown) therein. Each of the nonvolatile memory devices 220 to 240 may be configured in the same manner as the nonvolatile memory device 210.

Each of the nonvolatile memory devices 210 to 240 may be configured by one of a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

While it is illustrated in FIG. 1 that the data storage device 10 includes four nonvolatile memory devices 210 to 240, it is to be noted that the embodiment is not limited thereto. For example, the data storage device may include one, two, three, four or more than four memory devices.

Figure 2:
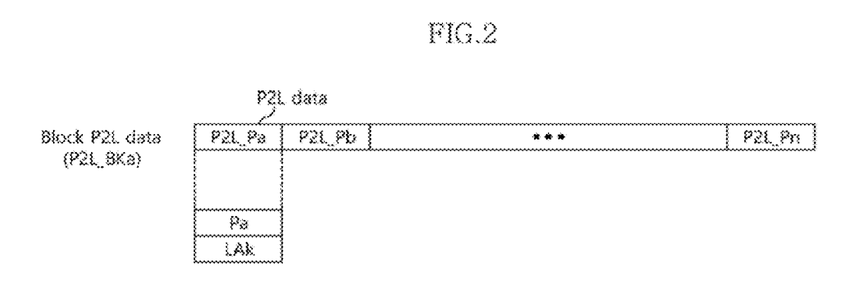
FIG. 2 is a diagram illustrating an example of block P2L data corresponding to a memory block of FIG. 1.

FIG. 2 is a diagram illustrating an example of block P2L data P2L_BKa corresponding to the memory block BKa of FIG. 1.

Referring to FIG. 2, the block P2L data P2L_BKa may include P2L data P2L_Pa to P2L_Pn. The P2L data P2L_Pa to P2L_Pn may correspond to the pages Pa to Pn, respectively, of the memory block BKa. For example, the P2L data P2L_Pa may correspond to the page Pa, and include a logical address LAk mapped to the page Pa. The P2L data P2L_Pa may be generated as write-requested data is stored in the page Pa in response to a write request for the logical address LAk.

Figure 3:
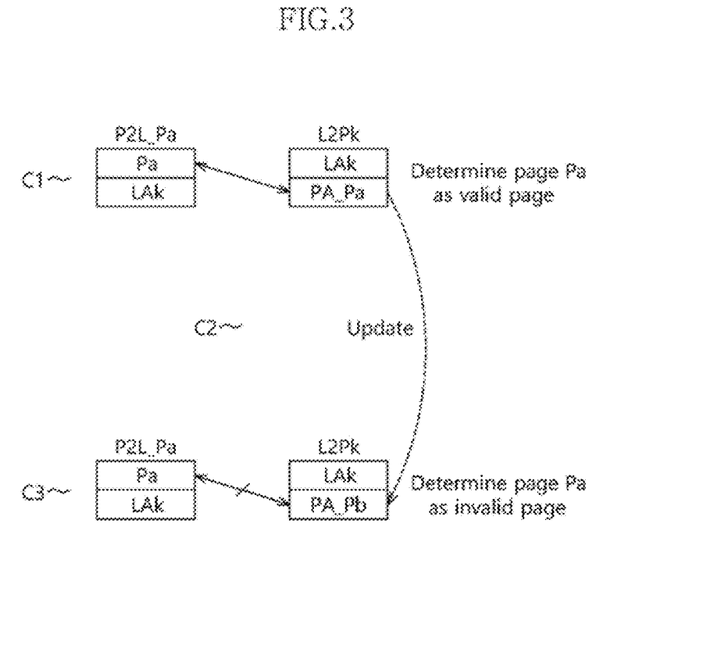
FIG. 3 is a diagram illustrating an example of a method for determining validity of a page through P2L data and L2P data.

FIG. 3 is a diagram illustrating an example of a method for determining validity of the page Pa through the P2L data P2L_Pa and L2P data L2Pk.

Referring to FIG. 3, first, in a situation C1, the controller 100 may manage not only the P2L data P2L_Pa but also the L2P data L2Pk. The L2P data L2Pk may correspond to the logical address LAk, and include a physical address PA_Pa mapped to the logical address LAk.

For example, when a write request for the logical address LAk is received from the external device, the controller 100 may store write-requested data in the page Pa, and then, not only generate the P2L data P2L_Pa including the logical address LAk but also generate the L2P data L2Pk including the physical address PA_Pa of the page Pa. Accordingly, the P2L data P2L_Pa and the L2P data L2Pk may be associated with each other through the common logical address LAk.

By comparing the P2L data P2L_Pa and the L2P data L2Pk associated with each other, the controller 100 may determine whether the page Pa corresponding to the P2L data P2L_Pa is a valid page or not. For example, when the L2P data L2Pk includes the physical address PA_Pa of the page Pa, the controller 100 may determine that the page Pa is a valid page.

Meanwhile, as time passes, in a situation C2, the external device may transmit a write request to store new data for the logical address LAk. In this case, the controller 100 may store write-requested data in a new page Pb, and map the logical address LAk to the new page Pb. Further, the controller 100 may update the L2P data L2Pk such that the L2P data L2Pk includes a physical address PA_Pb of the new page Pb.

Thereafter, in a situation C3, by comparing the P2L data P2L_Pa and the L2P data L2Pk associated with each other, the controller 100 may determine whether the page Pa corresponding to the P2L data P2L_Pa is a valid page or not. That is to say, the controller 100 may determine whether the L2P data L2Pk includes the physical address PA_Pa of the page Pa. Because the L2P data L2Pk does not include the physical address PA_Pa of the page Pa, the controller 100 determines that the page Pa is an invalid page. Hence, the page Pa is determined as an invalid page because it stores data that have been replaced by updated data stored in a different physical address, i.e., in the illustrated example, in page Pb.

In this way, for determining whether or not each of the pages included in the victim memory block is a valid page, the controller 100 may need P2L data corresponding to each of the pages, and need L2P data associated with the P2L data. L2P data may be stored by being distributed in the nonvolatile memory devices 210 to 240, and accordingly, quick finding and obtaining L2P data associated with P2L data may affect a direct influence on the performance of the garbage collection operation.

Figure 4:
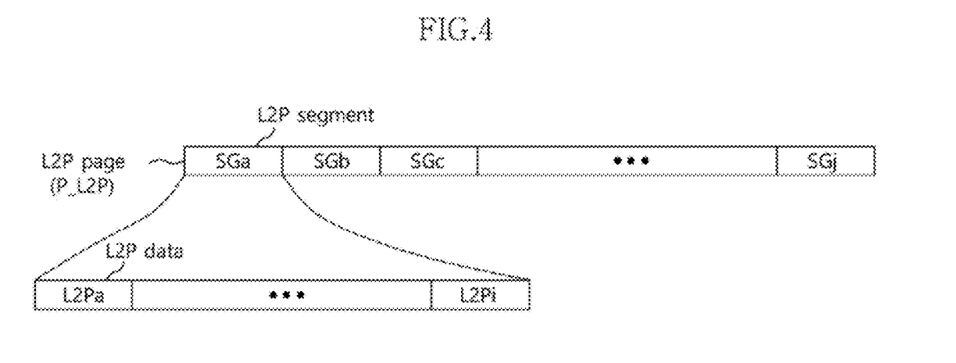
FIG. 4 is a diagram illustrating an example of an L2P page.

FIG. 4 is a diagram illustrating an example of an L2P page P_L2P. The L2P page P_L2P may be a certain page included in the nonvolatile memory devices 210 to 240 of FIG. 1.

Referring to FIG. 4, the L2P page P_L2P may include L2P segments SGa to SGJ. Each of the L2P segments SGa to SGJ may include a plurality of L2P data. For example, the L2P segment SGa may include a plurality of L2P data L2 Pa to L2Pi.

The controller 100 may obtain L2P data from the L2P page P_L2P by the unit of L2P segment. For example, when the L2P data L2Pa is needed, the controller 100 may obtain the L2P segment SGa from the L2P page P_L2P, and refer to the L2P data L2Pa from the L2P segment SGa.

Meanwhile, the controller 100 may manage successive logical addresses by dividing them by the unit of L2P segment. Therefore, the controller 100 is aware of all the L2P data included in a certain L2P segment, and conversely, be aware of the L2P segment including certain L2P data.

Therefore, the controller may quickly obtain the L2P data needed for the garbage collection operation by determining in which L2P page an L2P segment including the L2P data is stored and obtaining the L2P segment from the corresponding L2P page.

Figure 5A:
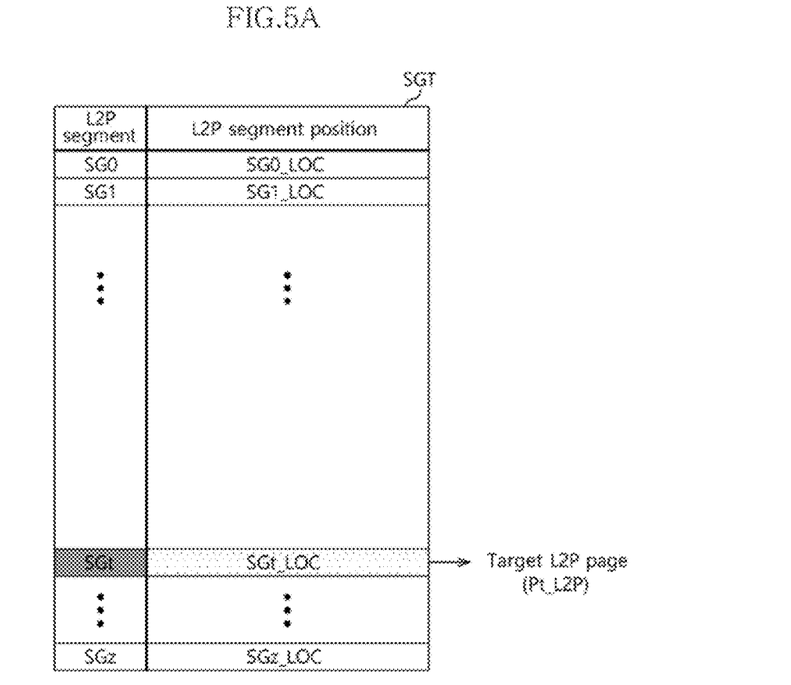
FIGS. 5A and 5B are diagrams illustrating examples of a method for a controller to obtain a target L2P segment.
Figure 5B:
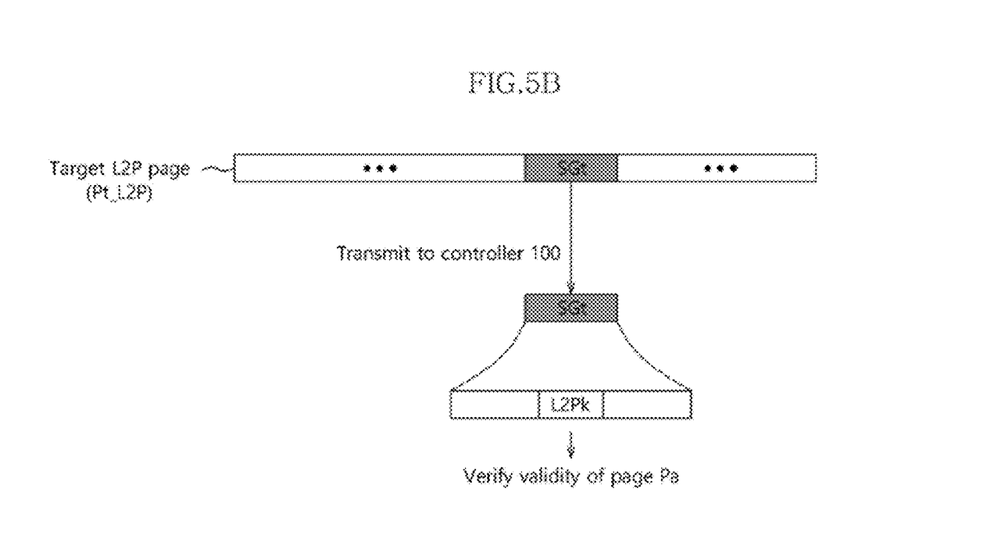

FIGS. 5A and 5B are diagrams illustrating an example of a method for the controller 100 to obtain a target L2P segment SGt. In the following descriptions, it will be assumed that the victim memory block of a garbage collection operation is the memory block BKa of FIG. 1. Thus, first, for verifying validity of the page Pa of the memory block BKa, the target L2P segment SGt may be obtained. Namely, the target L2P segment SGt may be an L2P segment which includes the L2P data L2Pk associated with the P2L data P2L_Pa of the page Pa.

Referring to FIG. 5A, first, the controller 100 may manage an L2P segment position table SGT. The L2P segment position table SGT may include position information SG0_LOC to SGz_LOC of all L2P segments SG0 to SGz which the controller 100 manages. While storing L2P segments in the nonvolatile memory devices 210 to 240, the controller 100 may generate positions where the L2P segments are stored, as L2P segment position information.

Hence, the controller 100 may determine an L2P page in which the target L2P segment SGt is stored by referring to the L2P segment position table SGT. That is, the controller 100 may determine a target L2P page Pt_L2P, by referring to the L2P segment position table SGT.

Referring to FIG. 5B, the controller 100 may obtain the target L2P segment SGt from the target L2P page Pt_L2P, and verify validity of the page Pa by referring to the L2P data L2Pk included in the target L2P segment SGt.

Meanwhile, a nonvolatile memory device (e.g., one of nonvolatile memory devices 210 to 240 in FIG. 1) may read data from a memory region to a data buffer therein by the unit of page. Therefore, before transmitting only the target L2P segment SGt to the controller 100, the nonvolatile memory device may once read all the L2P segments stored in the target L2P page Pt_L2P, to the data buffer therein. In this case, if other L2P segments are needed, besides the target L2P segment SGt, among the L2P segments read to the data buffer, a time required for performing the garbage collection operation may be shortened. That is, if L2P segments needed to determine validity of other pages besides the page Pa in the victim memory block BKa, are obtained together with the target L2P segment SGt, a time required for performing the garbage collection operation may be reduced.

As will be described later, according to an embodiment of the present disclosure, the controller 100 may obtain together with a target L2P segment SGt other needed L2P segments by searching them in the target L2P page Pt_L2P, thereby shortening the time required for performing the garbage collection operation.

Figure 6A:
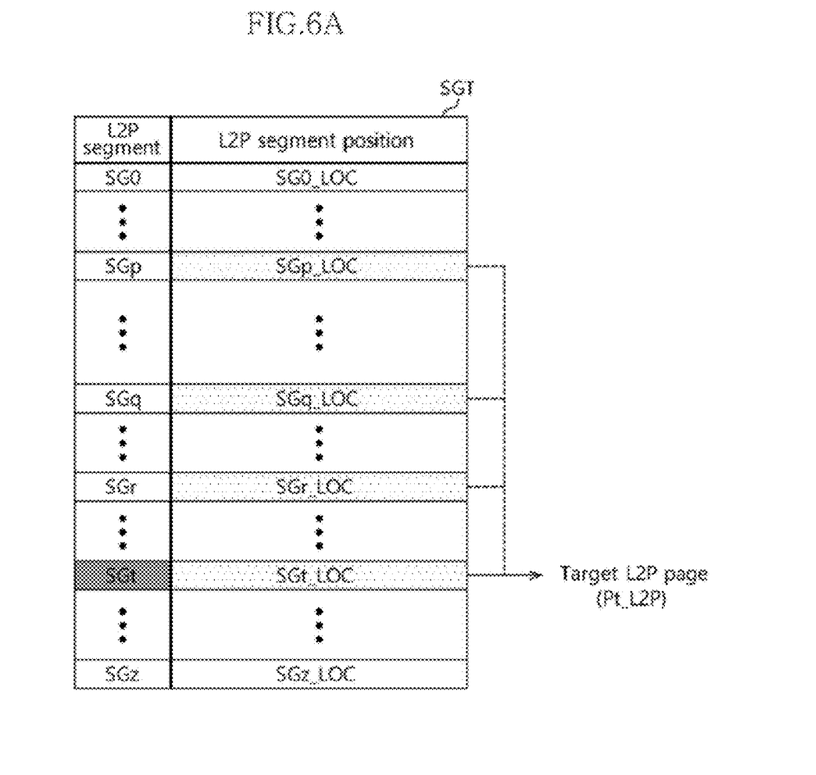
FIGS. 6A and 6B are diagrams illustrating examples of a method for the controller to read needed target L2P segments from a target L2P page.
Figure 6B:
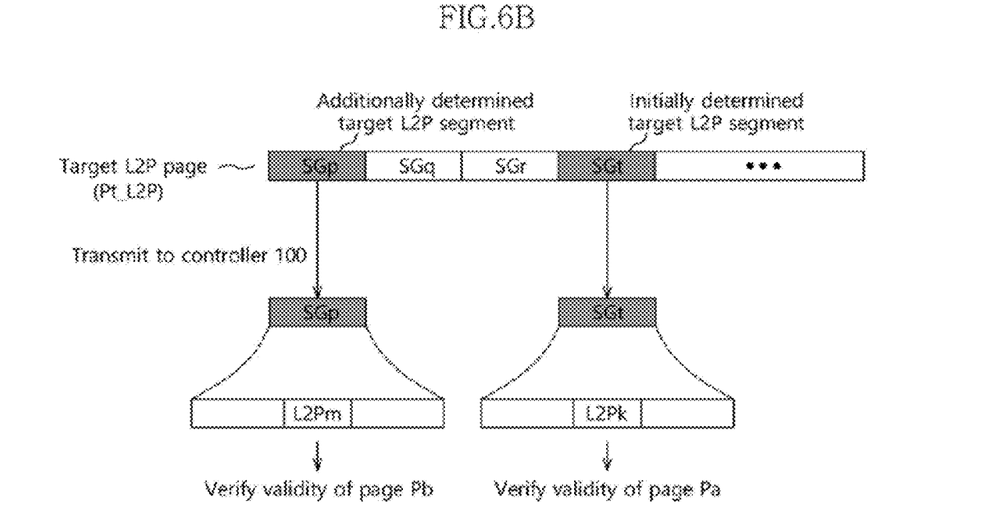

FIGS. 6A and 6B illustrate an example of a method for the controller 100 to obtain needed L2P segments SGp and SGt as target L2P segments, from the target L2P page Pt_L2P. In FIGS. 6A and 6B, the target L2P segments SGp and SGt may be some among the L2P segments needed to determine validity of the pages Pa to Pn of the memory block BKa of the memory device 210 of FIG. 1.

Referring to FIG. 6A, the controller 100 may determine the target L2P page Pt_L2P in which the target L2P segment SGt is stored, as described above with reference to FIG. 5A, by referring to the L2P segment position table SGT. Then, the controller 100 determines which other L2P segments are also stored in the target L2P page Pt_L2P by referring to the L2P segment position table SGT. In the illustrated example of FIG. 6A, the L2P segments SGp, SGq and SGr are also stored in the target L2P page Pt_L2P as shown by the L2P segment position table SGT. Since the controller 100 is aware of the positions of all the L2P segments SG0 to SGz by referring to the L2P segment position table SGT, the controller 100 may search and identify the L2P segments SGp, SGq and SGr which are stored in the target L2P page Pt_L2P in which the target L2P segment SGt is located.

The L2P segment SGp may include L2P data L2Pm needed to verify validity of the P2L data P2L_Pb of FIG. 2. The L2P segments SGq and SGr may not include L2P data needed to verify validity of the P2L data P2L_Pc to P2L_Pn of FIG. 2. As described above, the controller 100 may be aware of all the L2P data included in an L2P segment. Therefore, the controller 100 may additionally select the L2P segment SGp needed besides the target L2P segment SGt among the L2P segments SGp, SGq and SGr. The controller 100 may select the needed L2P segment SGp by determining whether each of the L2P segments SGp, SGq and SGr includes L2P data associated with at least one P2L data among the P2L data P2L_Pb to P2L_Pn.

Accordingly, referring to FIG. 6B, the controller 100 may obtain the initially determined target L2P segment SGt and the additionally selected target L2P segment SGp from the nonvolatile memory device. The controller 100 may verify validity of the page Pa by referring to the L2P data L2Pk included in the target L2P segment SGt, and verify validity of the page Pb by referring to the L2P data L2Pm included in the target P2P segment SGp.

Meanwhile, for the remaining pages Pc to Pn for which validity cannot be determined through the L2P segments located in the target L2P page Pt_L2P, validity may be determined from target L2P segments searched from other target L2P pages which are determined subsequently.

Figure 7:
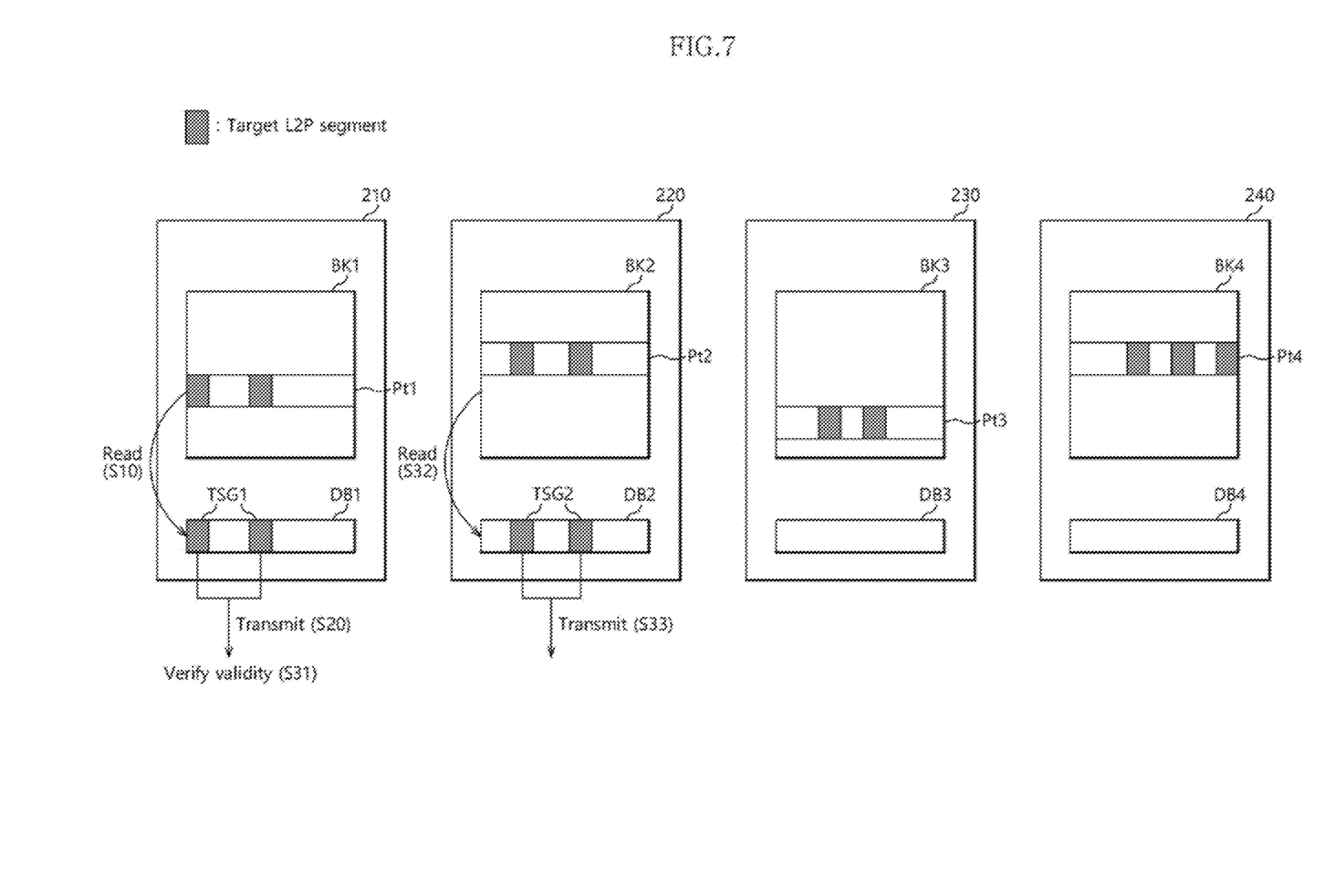
FIG. 7 is a diagram illustrating an example of a method for simultaneously performing read and transmission operations for a target L2P page and validity verification of a page.

FIG. 7 is a diagram illustrating an example of a method for simultaneously performing read and transmission operations for a target L2P page and validity verification of a page.

Referring to FIG. 7, the nonvolatile memory devices 210 to 240 may include memory blocks BK1 to BK4 and data buffers DB1 to DB4, respectively. We note that the number of memory blocks and data buffers per memory device may vary.

According to the illustrated embodiment of FIG. 7, for verifying the validity of the pages Pa to Pn of the memory block BKa of FIG. 1 (as described above with reference to FIGS. 5A to 6B) the controller 100 may determine target L2P pages Pt1, Pt2, Pt3 and Pt4 physically located in the nonvolatile memory devices 210, 220, 230 and 240 respectively, and determine target L2P segments in the respective target L2P pages Pt1 to Pt4. The controller 100 may control the nonvolatile memory device 210 so that the data stored in the target L2P page Pt1 are read to the data buffer DB1 (S10). The controller 100 may further control the nonvolatile memory device 210 so that only target L2P segments TSG1 are transmitted from the data buffer DB1 to the controller 100 (S20). While verifying validity of P2L data based on the target L2P segments TSG1, the controller 100 may control the nonvolatile memory device 220 so that the data stored in the target L2P page Pt2 are read to the data buffer DB2 and only target L2P segments TSG2 are transmitted from the data buffer DB2 to the controller 100 (S31, S32 and S33). In other words, if the target L2P pages Pt1 to Pt4 and target L2P segments are determined in the respective nonvolatile memory devices 210 to 240, validity verification through the target L2P segments may be obtained first from a first memory device, and at the same while the controller is performing the validity verification of P2L data based on the target L2P segments obtained from the first memory device, the controller may simultaneously perform a read operation for a target L2P page of a second memory device and a transmission operation of only target L2P segments to the controller 100. Therefore, the controller 100 may more quickly complete validity verification of the victim memory block.

While FIG. 7 illustrates that the validity verification (S31) and the read and transmission operations (S32 and S33) are performed simultaneously, it is to be noted that, according to an embodiment, the transmission operation (S20) from the data buffer DB1 to the controller 100 and the read operation (S32) may be performed simultaneously. Namely, while the nonvolatile memory device 210 transmits the target L2P segments TSG1 from the data buffer DB1 to the controller 100, the controller 100 may control the nonvolatile memory device 220 to read the data stored in the target L2P page Pt2, to the data buffer DB2.

Also, while FIG. 7 illustrates that the read and transmission operations (S32 and S33) are not controlled for the nonvolatile memory device 210 which obtains first the target L2P segments TSG1 but for another nonvolatile memory device 220, it is to be noted that, according to an embodiment, the controller 100 may determine a plurality of target L2P pages in the nonvolatile memory device 210 and then, while performing validity verification through the target L2P segments obtained from any one target L2P page, may control the nonvolatile memory device 210 to perform read and transmission operations for another target L2P page.

Figure 8:
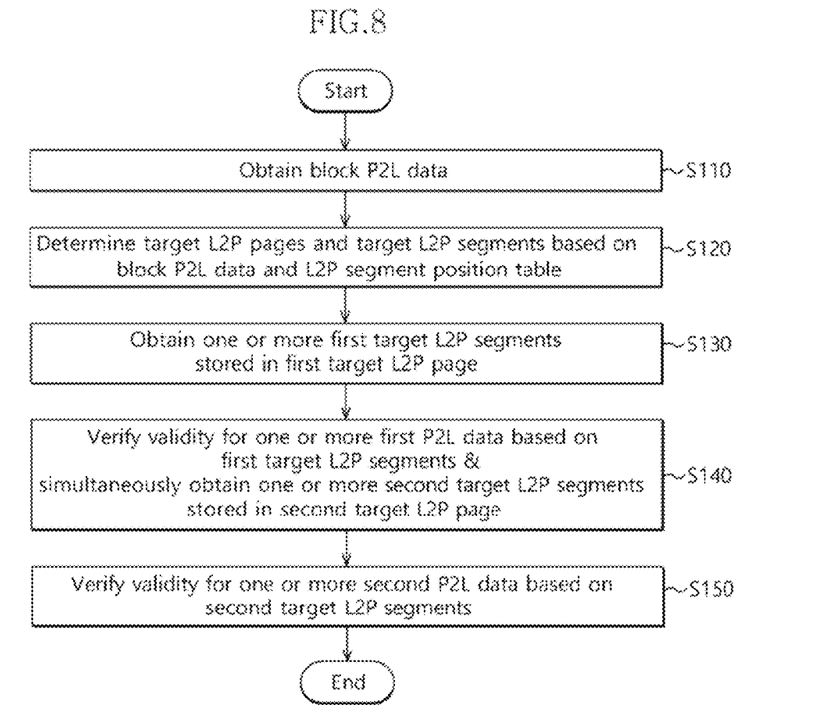
FIG. 8 is a flow chart illustrating a method for operating the data storage device of FIG. 1, according to an embodiment of the present invention.

FIG. 8 is a flow chart illustrating a method for operating the data storage device 10 of FIG. 1. In FIG. 8, the controller 100 may determine validity of P2L data corresponding to the pages of a victim memory block for a garbage collection operation.

Referring to FIG. 8, at step S110, the controller 100 may obtain block P2L data corresponding to the victim memory block. The block P2L data may include, a plurality of P2L data, each P2L data corresponding to a respective page of the victim memory block.

At step S120, the controller 100 may determine target L2P pages and target L2P segments, based on the block P2L data and an L2P segment position table. For example, the controller 100 may determine first and second target L2P pages and first and second target L2P segments stored in the first and second target L2P pages in at least one of the nonvolatile memory devices 210 to 240, based on the block P2L data and an L2P segment position table. For example, the controller 100 may determine each of the first and second target L2P pages by determining a target L2P segment based on P2L data included in the block P2L data, obtaining a position information of the target L2P segment by referring to the L2P segment position table and determining a page corresponding to the position information as a target L2P page. The controller 100 may search the first L2P segments stored in the first target L2P page based on the L2P segment position table, and determine the first target L2P segments among the first L2P segments based on the block P2L data. The controller 100 may determine whether each of the first L2P segments includes at least one L2P data associated with at least one P2L data included in the block P2L data, and determine first L2P segments each of which is determined to include at least one L2P data, as the first target L2P segments. The controller 100 may determine the second target L2P segments in the second target L2P page according to the method in which the first target L2P segments are determined in the first target L2P page.

At step S130, the controller 100 may obtain one or more first target L2P segments stored in the first target L2P page. For example, controller 100 may control a nonvolatile memory device including the first target L2P page so that the data stored in the first target L2P page are read to a data buffer of the corresponding nonvolatile memory device and the first target L2P segments among the data read to the data buffer are transmitted to the controller 100.

At step S140, the controller 100 may verify validity for one or more first P2L data of the block P2L data based on the first target L2P segments and simultaneously obtain one or more second target L2P segments stored in the second target L2P page. For example, when the first L2P data selected in each of the first target L2P segments includes a physical address corresponding to each of the first P2L data, the controller 100 may determine that the corresponding first P2L data is valid. The selected first L2P data may be associated with the first P2L data to be verified in validity thereof, through a common logical address.

While verifying validity, the controller 100 may obtain one or more second target L2P segments stored in the second target L2P page. The controller 100 may control a nonvolatile memory device including the second target L2P page such that the data stored in the second target L2P page are read to a data buffer of the corresponding nonvolatile memory device and the second target L2P segments among the data read to the data buffer are transmitted to the controller 100.

At step S150, the controller 100 may verify validity for one or more second P2L data of the block P2L data based on the second target L2P segments. For example, when the second L2P data selected in each of the second target L2P segments includes a physical address corresponding to each of the second P2L data, the controller 100 may determine that the corresponding second P2L data is valid. The selected second L2P data may be associated with the second P2L, through a common logical address.

Figure 9:
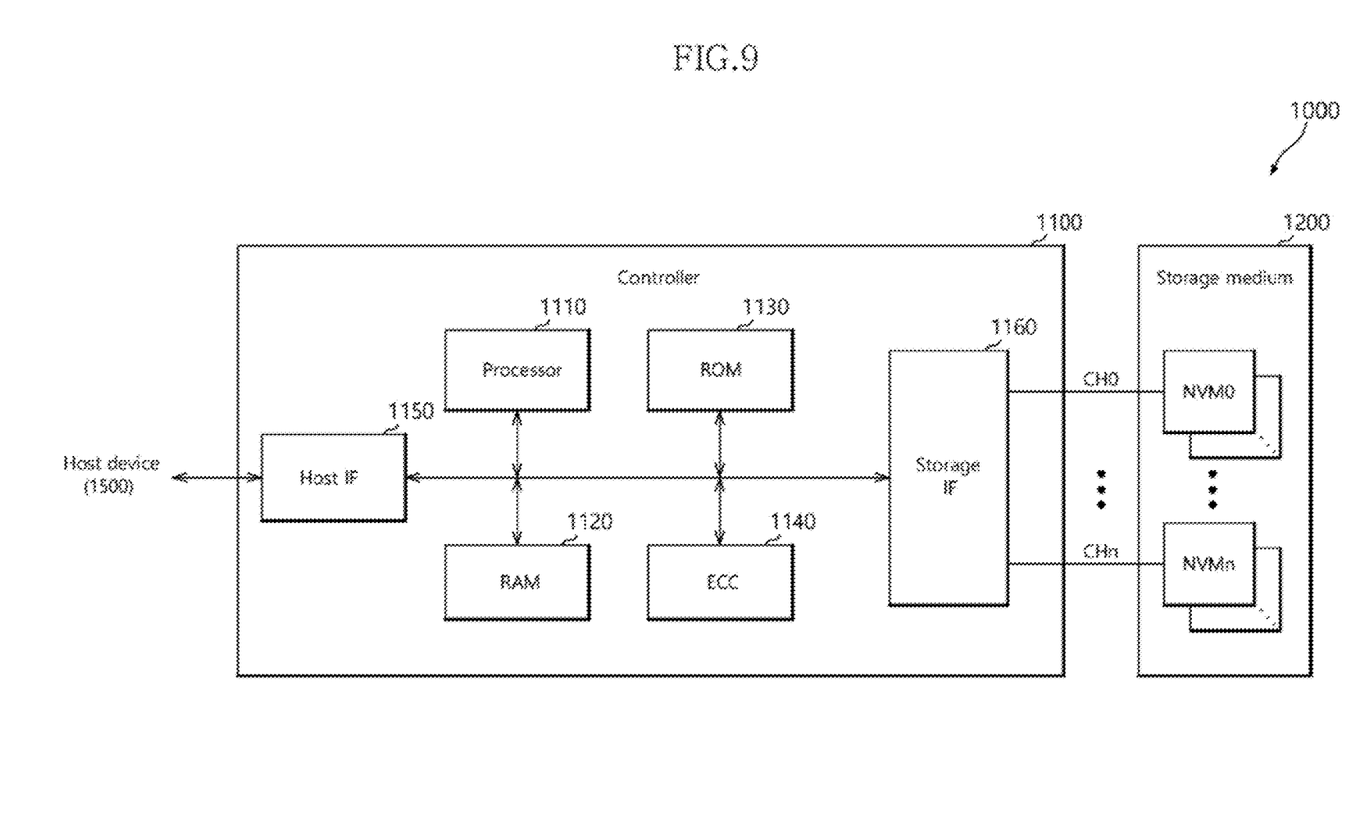
FIG. 9 is a block diagram illustrating a solid state drive (SSD), according to an embodiment of the present invention.

FIG. 9 illustrates a solid state drive (SSD) 1000, according to an embodiment of the present invention.

Referring to FIG. 9, the SSD 1000 may include a controller 1100 and a storage medium 1200.

The controller 1100 may control data exchange between a host device 1500 and the storage medium 1200. The controller 1100 may include a processor 1110, a random access memory (RAM) 1120, a read only memory (ROM) 1130, an error correction code (ECC) unit 1140, a host interface (IF) 1150, and a storage medium interface (IF) 1160 electrically coupled via an internal bus.

The controller 1100 may operate substantially similarly to the controller 100 shown in FIG. 1. In order to verify the validity of block P2L data, the controller 1100 may determine a target L2P page for each of a plurality of nonvolatile memory devices NVM0 to NVMn, and determine target L2P segments stored in the target L2P page. The controller 1100 may control at least one nonvolatile memory device to output target L2P segments to the controller 1100 and verify validity of P2L data based on the outputted target L2P segments. At the same time, the controller 1100 may control another nonvolatile memory device to read data stored in a target L2P page of the corresponding nonvolatile memory device, to a data buffer in the corresponding nonvolatile memory device.

The processor 1110 may control the general operations of the controller 1100. The processor 1110 may store data in the storage medium 1200 and read stored data from the storage medium 1200, according to data processing requests from the host device 1500. In order to efficiently manage the storage medium 1200, the processor 1110 may also control internal operations of the SSD 1000 such as a merge operation, a wear leveling operation, and so forth.

The RAM 1120 may store programs and program data to be used by the processor 1110. The RAM 1120 may temporarily store data received through the host interface 1150 before transferring it to the storage medium 1200, and may temporarily store data received from the storage medium 1200 before transferring it to the host device 1500.

The ROM 1130 may store program codes to be read by the processor 1110. The program codes may include commands to be processed by the processor 1110, for the processor 1110 to control the internal units of the controller 1100.

The ECC unit 1140 may encode data to be stored in the storage medium 1200, and may decode data read from the storage medium 1200. The ECC unit 1140 may detect and correct an error occurred in data, according to an ECC algorithm.

The host interface 1150 may exchange data processing requests, data, etc. with the host device 1500.

The storage medium interface 1160 may transmit control signals and data to the storage medium 1200. The storage medium interface 1160 may receive data from the storage medium 1200. The storage medium interface 1160 may be coupled with the storage medium 1200 through a plurality of channels CH0 to CHn.

The storage medium 1200 may include the plurality of nonvolatile memory devices NVM0 to NVMn. Each of the plurality of nonvolatile memory devices NVM0 to NVMn may perform a write operation and a read operation according to control of the controller 1100.

Figure 10:
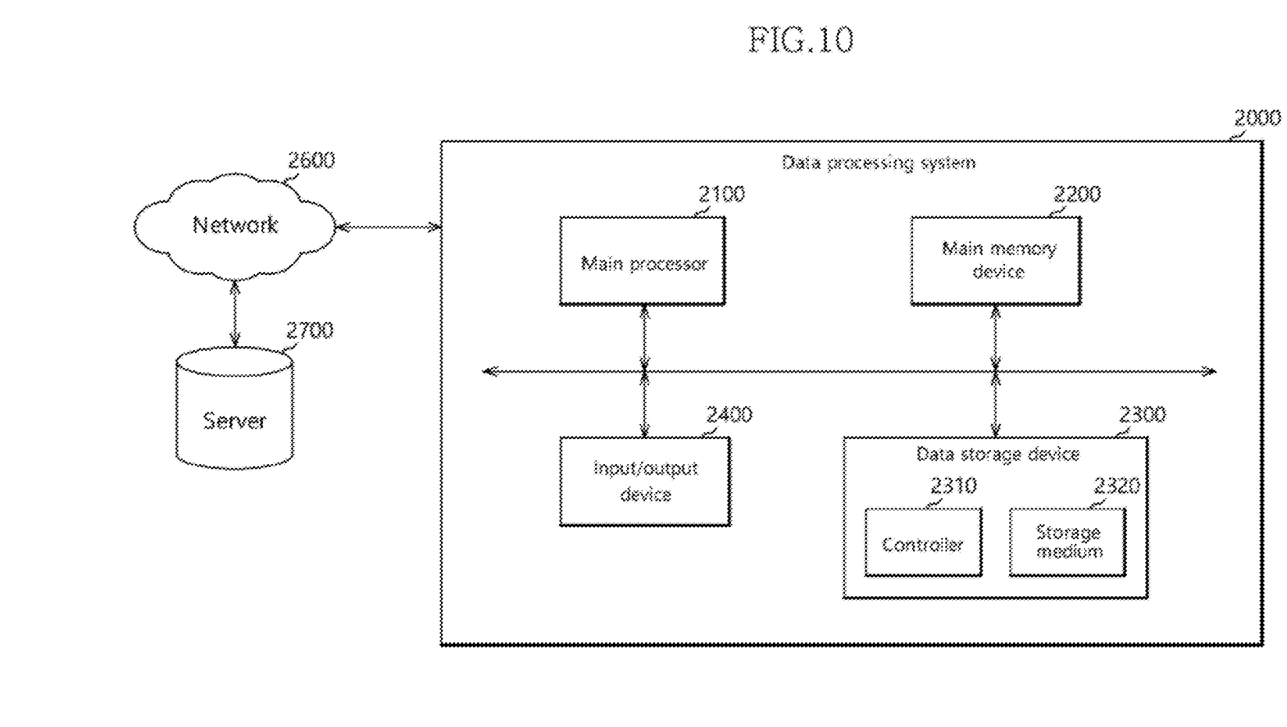
FIG. 10 is a block diagram illustrating a data processing system including a data storage device, according to an embodiment of the present invention.

FIG. 10 is a block diagram illustrating a data processing system 2000 including a data storage device 10 according to an embodiment of the invention.

The data processing system 2000 may include a computer, a laptop, a netbook, a smart phone, a digital television (TV), a digital camera, a navigator, and the like. The data processing system 2000 may include a main processor 2100, a main memory device 2200, a data storage device 2300, and an input/output device 2400 electrically coupled via an internal bus.

The main processor 2100 may control the general operations of the data processing system 2000. The main processor 2100 may be a central processing unit such as a microprocessor. The main processor 2100 may execute software such as an operation system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate in a manner substantially similar to the data storage device 10 shown in FIG. 1.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a local area network (LAN), a wide area network (WAN), a wireless network, and so on. The data processing system 2000 may include a network interface (not shown) to access the network 2600.

While various embodiments have been described above, it will be understood to those skilled in the art that the embodiments described are examples only. Accordingly, the data storage device and the operating method thereof described herein should not be limited to the described embodiments. It will be apparent to those skilled in the art to which the present invention pertains that various other changes and modifications may be made without departing from the spirit and scope of the invention as defined in the following claims.

What is claimed is:

1. A data storage device comprising:
   a plurality of nonvolatile memory devices including a plurality of memory blocks, each memory block including a plurality of pages; and
   a controller suitable for:
   obtaining block physical to logical (P2L) data corresponding to a first memory block in the plurality of nonvolatile memory devices,
   determining a first target logical to physical (L2P) page included in a first nonvolatile memory device and one or more first target L2P segments stored in the first target L2P page, based on the block P2L data and an L2P segment position table,
   determining a second target L2P page included in a second nonvolatile memory device and one or more second target L2P segments stored in the second target page, based on the block P2L data and the L2P segment position table,
   obtaining the first target L2P segments read from the first nonvolatile memory device, and
   verifying validity for one or more first P2L data included in the block P2L data, based on the first target L2P segments,
   wherein the controller obtains the second target L2P segments read from the second nonvolatile memory device while verifying the validity for the first P2L data,
   wherein the controller identifies a plurality of first L2P segments, which are readable together at the same time by the first nonvolatile memory device from the first target L2P page, by comparing respective position information of L2P segments included in the L2P segment position table with a position information of the first target L2P page, and selects the first target L2P segments from the first L2P segments except non-target L2P segments, and
   wherein the first nonvolatile memory device reads the first target L2P segments together at the same time from the first target L2P page to a data buffer and outputs the first target L2P segments from the data buffer to the controller.

2. The data storage device according to claim 1, wherein the controller determines a first target L2P segment based on the block P2L data, obtains a position information of the first target L2P segment by referring to the L2P segment position table, and determines a page corresponding to the position information, as the first target L2P page.

3. The data storage device according to claim 1, wherein the controller determines whether each of the first L2P segments includes at least one L2P data associated with at least one P2L data included in the block P2L data, and determines first L2P segments each of which is determined to include at least one L2P data, as the first target L2P segments.

4. The data storage device according to claim 1, wherein the controller determines, when first L2P data included in a selected first target L2P segment includes a physical address corresponding to selected first P2L data, that the selected first P2L data is valid, and
   the first L2P data is associated with the selected first P2L data through a common logical address.

5. The data storage device according to claim 1, wherein the controller determines a page corresponding to the first P2L data of which validity is verified, as a valid page, and stores data stored in the valid page in an empty page of a second memory block among the plurality of memory blocks.

6. A method for operating a data storage device including a controller and a plurality of nonvolatile memory devices, each nonvolatile memory device including a plurality of memory blocks, each memory block including a plurality of pages comprising:
   obtaining, by the controller, block physical to logical (P2L) data corresponding to a first memory block in the plurality of nonvolatile memory devices;
   determining, by the controller, a first target logical to physical (L2P) page included in a first nonvolatile memory device and one or more first target L2P segments stored in the first target L2P page, based on the block P2L data and an L2P segment position table;
   determining, by the controller, a second target L2P page included in a second nonvolatile memory device and one or more second target L2P segments stored in the second target L2P page, based on the block P2L data and the L2P segment position table;
   obtaining, by the controller, the first target L2P segments read from the first nonvolatile memory device;
   verifying, by the controller, validity for one or more first P2L data included in the block P2L data, based on the first target L2P segments; and
   obtaining, by the controller, the second target L2P segments read from the second nonvolatile memory device while verifying the validity for the first P2L data,
   wherein the determining of the first target L2P segments comprises:
   identifying, by the controller, a plurality of first L2P segments, which are readable together at the same time by the first nonvolatile memory device from the first target L2P page, by comparing respective position information of L2P segments included in the L2P segment position table with a position information of the first target L2P page; and selecting, by the controller, the first target L2P segments from the first L2P segments except non-target L2P segments, so that the first nonvolatile memory device reads the first target L2P segments together at the same time from the first target L2P page to a data buffer and outputs the first target L2P segments from the data buffer to the controller.

7. The method according to claim 6, wherein the determining of the first and second target L2P pages comprises:

determining a first target L2P segment based on the block P2L data;

obtaining a position information of the first target L2P segment by referring to the L2P segment position table; and determining a page corresponding to the position information, as the first target L2P page.

8. The method according to claim 6, wherein the determining of the first target L2P segments comprises:

determining whether each of the first L2P segments includes at least one L2P data associated with at least one P2L data included in the block P2L data; and determining first L2P segments each of which is determined to include at least one L2P data, as the first target L2P segments.

9. The method according to claim 6, wherein the verifying of the validity for the first P2L data comprises:

determining, when first L2P data included in a selected first target L2P segment includes a physical address corresponding to selected first P2L data, that the selected first P2L data is valid, the first L2P data being associated with the selected first P2L data through a common logical address.

10. The method according to claim 6, further comprising:

determining a page corresponding to the first P2L data of which validity is verified, as a valid page; and storing data stored in the valid page in an empty page of a second memory block among the plurality of memory blocks.

* * * * *